(12) United States Patent
Longchambon et al.

(10) Patent No.: US 8,987,353 B2
(45) Date of Patent: Mar. 24, 2015

(54) RUBBER COMPOSITION INCLUDING AN ORGANOSILANE COUPLING AGENT

(75) Inventors: Karine Longchambon, Beaumont (FR); José Carlos Araujo Da Silva, Pont du Chateau (FR); Nicolas Seeboth, Clermont-Ferrand (FR)

(73) Assignees: Michelin Recherche et Technique S.A., Granges-Paccot (CH); Compagnie Generale des Etablissements Michelin, Clermont-Ferrand (FR)

( * ) Notice: Subject to any disclaimer, the term of this patent is extended or adjusted under 35 U.S.C. 154(b) by 251 days.

(21) Appl. No.: 13/321,824

(22) PCT Filed: May 20, 2010

(86) PCT No.: PCT/EP2010/003114
§ 371 (c)(1),
(2), (4) Date: Mar. 6, 2012

(87) PCT Pub. No.: WO2010/133371
PCT Pub. Date: Nov. 25, 2010

(65) Prior Publication Data
US 2012/0157571 A1    Jun. 21, 2012

(30) Foreign Application Priority Data

May 20, 2009 (FR) ..................................... 09 02451

(51) Int. Cl.
| | |
|---|---|
| C08J 3/20 | (2006.01) |
| C08K 3/36 | (2006.01) |
| B60C 1/00 | (2006.01) |
| C08K 5/548 | (2006.01) |
| C08L 9/06 | (2006.01) |
| C08L 9/00 | (2006.01) |
| C08L 57/02 | (2006.01) |

(52) U.S. Cl.
CPC .................. C08K 3/36 (2013.01); B60C 1/0016 (2013.01); C08K 5/548 (2013.01); C08L 9/06 (2013.01); C08L 9/00 (2013.01); C08L 57/02 (2013.01)

USPC ............ 523/351; 524/265; 524/437; 524/492

(58) Field of Classification Search
USPC ........................... 523/351; 524/265, 437, 492
See application file for complete search history.

(56) References Cited

U.S. PATENT DOCUMENTS

| | | | |
|---|---|---|---|
| 7,217,751 B2 | 5/2007 | Durel et al. | |
| 7,662,874 B2 | 2/2010 | Korth et al. | |
| 2004/0019144 A1 | 1/2004 | Bortolotti et al. | |
| 2004/0266968 A1 | 12/2004 | Korth et al. | |
| 2009/0131572 A1* | 5/2009 | Cambon et al. | ............... 524/437 |

FOREIGN PATENT DOCUMENTS

| | | |
|---|---|---|
| EP | 0 994 150 | 3/2004 |
| GB | 1 299 941 | 12/1972 |
| RU | 2190641 | 10/2002 |
| RU | 2003132472 | 3/2005 |
| RU | 2308469 | 10/2007 |
| RU | 2007106746 | 8/2008 |
| RU | 2348642 | 10/2009 |
| WO | WO 2006/013056 | 2/2006 |
| WO | WO 2007/098784 | 9/2007 |

* cited by examiner

Primary Examiner — Edward Cain
(74) Attorney, Agent, or Firm — Cozen O'Connor

(57) ABSTRACT

A rubber composition that can be used for the manufacture of tires, based on at least one diene elastomer; one sulphur-based crosslinking system; one inorganic filler as reinforcing filler; one coupling agent of general formula I below: $(HO)_{3-n}R^1{}_nSi-Z-S_m-R^2$ wherein in which: $R^1$, which are identical or different, each represent a monovalent hydrocarbon-based group chosen from alkyls, which are linear or branched, cycloalkyls or aryls, having from 1 to 18 carbon atoms; $R^2$ represents a monovalent hydrocarbon-based group chosen from alkyls, which are linear or branched, cycloalkyls or aryls, having from 1 to 30 carbon atoms; Z represents a divalent bonding group comprising from 1 to 18 carbon atoms; n is an integer equal to 0, 1 or 2; and m is a number greater than or equal to 2.

22 Claims, No Drawings

RUBBER COMPOSITION INCLUDING AN ORGANOSILANE COUPLING AGENT

RELATED APPLICATIONS

This is a U.S. national stage of application No. PCT/EP2010/003114, filed on 20 May 2010. Priority is claimed on Application No. 09/02451 filed in France on 20 May 2009, the content of which is hereby incorporated herein by reference.

FIELD OF THE INVENTION

The present invention relates to diene rubber compositions, reinforced with an inorganic filler such as silica, which can be used, in particular, for the manufacture of tires or of semi-finished products for tires such as treads.

BACKGROUND OF THE INVENTION

It is generally known that in order to obtain the optimum reinforcing properties imparted by a filler, this filler should be present in the elastomer matrix in a final form that is both as finely divided as possible and as uniformly distributed as possible. However, such conditions can be achieved only if the filler has a very good capacity, on the one hand, to be incorporated into the matrix during the mixing with the elastomer and to deagglomerate, and, on the other hand, to disperse uniformly in this matrix.

As is well known, carbon black exhibits such capacities, which is not generally the case for inorganic fillers. Indeed, for reasons of mutual affinities, the inorganic filler particles have an annoying tendency to agglomerate together in the elastomer matrix. These interactions have the harmful consequence of limiting the dispersion of the filler and thus of limiting the reinforcing properties to a level that is substantially below that which it would theoretically be possible to achieve if all the bonds (inorganic filler/elastomer) capable of being created during the compounding operation were actually obtained. Moreover, these interactions tend to increase the consistency in the uncured state of the rubber compositions, and thus to render the processing ("processability") thereof more difficult than in the presence of carbon black.

Ever since savings in fuel and the need to protect the environment have become a priority, it has however proved necessary to produce tires that have a reduced rolling resistance without having a disadvantageous effect on their wear resistance. This has been made possible in particular by virtue of the discovery of novel rubber compositions reinforced with specific inorganic fillers that are described as "reinforcing" and that are capable of competing, from a reinforcing viewpoint, with a conventional tyre-grade carbon black, while giving these compositions a lower hysteresis, synonymous with a lower rolling resistance for the tires comprising them.

Such rubber compositions, comprising reinforcing inorganic fillers of the siliceous or aluminous type, have, for example, been described in the patents or patent applications EP-A-0501227 (or U.S. Pat. No. 5,227,425), EP-A-0735088 (or U.S. Pat. No. 5,852,099), EP-A-0810258 (or U.S. Pat. No. 5,900,449), EP-A-0881252, WO99/02590, WO99/02601, WO99/02602, WO99/28376, WO00/05300 and WO00/05301.

Mention will be made in particular of documents EP-A-0501227, EP-A-0735088 or EP-A-0881252 which disclose diene rubber compositions reinforced with highly dispersible precipitated silicas, such compositions making it possible to manufacture treads having a substantially improved rolling resistance, without adversely affecting the other properties, in particular the grip, endurance and wear resistance properties. Such compositions exhibiting such a compromise of contradictory properties are also described in applications EP-A-0810258 and WO99/28376, with, as reinforcing inorganic fillers, specific, highly dispersible aluminous fillers (aluminas or aluminium (oxide)hydroxides), or else in applications WO00/73372 and WO00/73373, which describe specific titanium oxides of reinforcing type.

The use of these specific, highly dispersible inorganic fillers, whether as the predominant reinforcing filler or not, has certainly reduced the difficulties in processing rubber compositions containing them, but this processing nevertheless remains more difficult than for rubber compositions conventionally filled with carbon black.

In particular, it is necessary to use a coupling agent, also referred to as a bonding agent, the role of which is to provide the bonding between the surface of the inorganic filler particles and the elastomer, while facilitating the dispersion of this inorganic filler within the elastomer matrix.

It is recalled here that the expression "coupling agent" (inorganic filler/elastomer coupling agent) is understood, in a known manner, to mean an agent capable of establishing a sufficient bond, of chemical and/or physical nature, between the inorganic filler and the diene elastomer; such a coupling agent, which is at least bifunctional, has, for example, a simplified general formula "Y-W-X", in which:

Y represents a functional group ("Y" function) which is capable of bonding physically and/or chemically to the inorganic filler, such a bond possibly being established, for example, between a silicon atom of the coupling agent and the surface hydroxyl (OH) groups of the inorganic filler (for example, the surface silanols when it is silica);

X represents a functional group ("X" function) capable of bonding physically and/or chemically to the diene elastomer, for example via a sulphur atom; and W represents a divalent group allowing Y to be linked to X.

The coupling agents in particular must not be confused with simple agents for covering the inorganic filler which, in a known manner, may comprise the Y function that is active with respect to the inorganic filler but are devoid of the X function that is active with respect to the diene elastomer.

Coupling agents, in particular silica/diene elastomer coupling agents, have been described in a large number of documents, the most well known being bifunctional organosilanes bearing at least one alkoxyl function as the Y function, and, as the X function, at least one function capable of reacting with the diene elastomer such as for example a sulphurated (i.e., sulphur-containing) function.

Thus, it has been proposed in patent applications FR-A-2094859 or GB-A-1310379 to use a mercaptoalkoxysilane coupling agent for manufacturing tyre treads. It was rapidly demonstrated and it is today well known that mercaptoalkoxysilanes are capable of providing excellent silica/elastomer coupling properties, but that the industrial use of these coupling agents is not possible due to the very high reactivity of sulphurated functions of thiol —SH type (X functions) that very rapidly result, during the preparation of rubber compositions in an internal mixer, in premature vulcanizations also referred to as "scorching", in very high viscosities in the uncured state, and ultimately in rubber compositions that are almost impossible to work and to process industrially. To illustrate this problem, mention may be made, for example, of documents FR-A-2206330, U.S. Pat. No. 3,873,489 and U.S. Pat. No. 4,002,594.

To overcome this drawback, it has been proposed to replace these mercaptoalkoxysilanes with alkoxysilane polysulphides, especially bis(alkoxylsilylpropyl)polysulphides as described in very many documents (see, for example, FR-A-2149339, FR-A-2206330, U.S. Pat. Nos. 3,842,111, 3,873,489, 3,997,581, EP-A-680997 or U.S. Pat. No. 5,650,457, EP-A-791622 or U.S. Pat. No. 5,733,963, DE-A-19951281 or EP-A-1043357 and WO00/53671). Among these polysulphides, mention should especially be made of bis(3-triethoxysilyl-propyl) tetrasulphide (abbreviated to TESPT) and bis (3-triethoxysilylpropyl) disulphide (abbreviated to TESPD).

These alkoxysilane polysulphides, in particular TESPT, are generally considered to be the products that provide, for vulcanizates comprising a reinforcing inorganic filler, in particular silica, the best compromise in terms of scorch safety, ease of processing and reinforcing power. They are, in this respect, the most widely used coupling agents today in rubber compositions for tires.

SUMMARY OF THE INVENTION

The Applicants have surprisingly found that novel coupling agents of organosilane type made it possible, in particular compared to the aforementioned alkoxysilane polysulphides, to further improve the processability, in the uncured state, of compositions comprising them, and also the scorch safety.

Thus, one aspect of the invention is directed to a rubber composition that can be used for the manufacture of tires, based on at least:
one diene elastomer;
one sulphur-based crosslinking system;
one inorganic filler as reinforcing filler;
one coupling agent of general formula I below:

$$(HO)_{3-n} R^1{}_n Si—Z—S_m—R^2$$

in which:
R$^1$, which are identical or different, each represent a monovalent hydrocarbon-based group chosen from alkyls, which are linear or branched, cycloalkyls or aryls, having from 1 to 18 carbon atoms;
R$^2$ represents a monovalent hydrocarbon-based group chosen from alkyls, which are linear or branched, cycloalkyls or aryls, having from 1 to 30 carbon atoms;
Z represents a divalent bonding group comprising from 1 to 18 carbon atoms;
n is an integer equal to 0, 1 or 2; and m is a number greater than or equal to 2.

Such a composition also makes it possible, quite surprisingly, to very significantly decrease the zinc of rubber formulations reinforced with an inorganic filler such as silica, or even to eliminate it completely, without replacing the zinc with another metal and while protecting the rubber compositions from the problem of premature scorching during the industrial processing thereof. This result proves to be all the more surprising since the TESPT coupling agent is not suitable for compositions that are zinc-free or almost zinc-free.

Indeed, it is recalled that one medium-term objective of tyre manufacturers is to eliminate zinc or its derivatives from their rubber formulations, due to the known, relatively toxic nature of these compounds, especially with respect to water and aquatic organisms (classification R50 according to European Directive 67/548/EEC of 9 Dec. 1996).

However, the elimination of zinc oxide, specifically from rubber formulations reinforced with an inorganic filler such as silica, is highly detrimental to the processing characteristics ("processability") of the rubber compositions in the uncured state, with a reduction in the scorch time that is unacceptable from an industrial point of view.

Advantageously, the diene elastomer being chosen from the group consisting of polybutadienes, synthetic polyisoprenes, natural rubber, butadiene copolymers, isoprene copolymers and mixtures of these elastomers.

Preferably, the reinforcing inorganic filler is the predominant reinforcing filler; and more preferably it is a siliceous or aluminous filler.

Another aspect of the invention relates to a preparation of a composition, characterized in that, incorporated at least, by kneading, into at least (i) one diene elastomer, are (ii) an inorganic filler as reinforcing filler, (iii) a coupling agent of general formula I below:

$$(HO)_{3-n} R^1{}_n Si—Z—S_m—R^2$$

in which:
R$^1$, which are identical or different, each represent a monovalent hydrocarbon-based group chosen from alkyls, which are linear or branched, cycloalkyls or aryls, having from 1 to 18 carbon atoms;
R$^2$ represents a monovalent hydrocarbon-based group chosen from alkyls, which are linear or branched, cycloalkyls or aryls, having from 1 to 30 carbon atoms;
Z represents a divalent bonding group comprising from 1 to 18 carbon atoms;
n is an integer equal to 0, 1 or 2; and
m is a number greater than or equal to 2, and (iv) a sulphur-based vulcanization system.

Another aspect of the invention relates to a tyre or a semi-finished product, in particular a tread, comprising a rubber composition based on at least:
one diene elastomer;
one sulphur-based crosslinking system;
one inorganic filler as reinforcing filler;
one coupling agent of general formula I below:

$$(HO)_{3-n} R^1{}_n Si—Z—S_m—R^2$$

in which:
R$^1$, which are identical or different, each represent a monovalent hydrocarbon-based group chosen from alkyls, which are linear or branched, cycloalkyls or aryls, having from 1 to 18 carbon atoms;
R$^2$ represents a monovalent hydrocarbon-based group chosen from alkyls, which are linear or branched, cycloalkyls or aryls, having from 1 to 30 carbon atoms;
Z represents a divalent bonding group comprising from 1 to 18 carbon atoms;
n is an integer equal to 0, 1 or 2; and
m is a number greater than or equal to 2.

I. MEASUREMENTS AND TESTS USED

The rubber compositions are characterized, before and after curing, as indicated below.

I-1. Mooney Plasticity

Use is made of an oscillating consistometer as described in French Standard NF T 43-005 (1991). The Mooney plasticity measurement is carried out according to the following principle: the composition in the uncured state (i.e., before curing) is moulded in a cylindrical chamber heated to 100° C. After preheating for one minute, the rotor rotates within the test specimen at 2 rpm and the working torque for maintaining this movement is measured after rotating for 4 minutes. The Mooney plasticity (ML 1+4) is expressed in "Mooney unit" (MU, with 1 MU=0.83 Newton.meter).

I-2. Scorch Time

The measurements are carried out at 130° C., in accordance with French Standard NF T 43-005. The change in the consistometric index as a function of time makes it possible to determine the scorch time of the rubber compositions, assessed in accordance with the abovementioned standard, by the parameter T5 (case of a large rotor), expressed in minutes, and defined as being the time necessary to obtain an increase in the consistometric index (expressed in MU) of 5 units above the minimum value measured for this index.

I-3. Dynamic Properties

The dynamic properties $\Delta G^*$ and $\tan(\delta)_{max}$ are measured on a viscosity analyser (Metravib VA4000), in accordance with Standard ASTM D 5992-96. The response of a sample of vulcanized composition (cylindrical test specimen with a thickness of 4 mm and with a cross section of 400 mm$^2$), subjected to a sinusoidal stress in simple alternating shear, at a frequency of 10 Hz, under normal temperature conditions (23° C.), is recorded in accordance with Standard ASTM D 1349-99. A scan with a strain amplitude ranging from 0.1 to 50% (forward cycle) then from 50% to 0.1% (return cycle) is carried out. The results made use of are the complex dynamic shear modulus (G*) and the loss factor (tan $\delta$). For the return cycle, the maximum value of tan $\delta$ observed ($\tan(\delta)_{max}$), and also the difference in the complex modulus ($\Delta G^*$) between the values at 0.1% and 50% strain (the Payne effect) are indicated.

II. DETAILED DESCRIPTION

The compositions of the invention are therefore based on at least: (i) one (at least one) diene elastomer, (ii) one (at least one) inorganic filler as reinforcing filler, (iii) one (at least one) organosilane of general formula (I) as inorganic filler/diene elastomer coupling agent (phr=parts per hundred parts of elastomer, by weight).

The expression "composition based on" should be understood, in the present application, to mean a composition comprising the reaction product and/or mixture of the various constituents used, some of these base constituents (for example the coupling agent) being capable of reacting or intended to react with one another, at least in part, during the various phases of manufacture of the compositions, in particular during their vulcanization (curing).

In the present description, unless expressly indicated otherwise, all the percentages (%) indicated are % by weight.

II-1. Diene Elastomer

A "diene" elastomer or rubber is understood to mean, generally, an elastomer resulting at least partly (i.e., a homopolymer or a copolymer) from diene monomers (monomers bearing two carbon-carbon double bonds which may or may not be conjugated).

Diene elastomers may be classified, in a known manner, into two categories: those said to be "essentially unsaturated" and those said to be "essentially saturated". The expression "essentially unsaturated diene elastomer" is understood to mean a diene elastomer resulting at least partly from conjugated diene monomers, having a content of units of diene origin (conjugated dienes) that is greater than 15% (mol %). Thus, for example, diene elastomers such as butyl rubbers or diene/a-olefin copolymers of the EPDM type do not fall under this definition and may be described, on the contrary, as "essentially saturated diene elastomers" (low or very low content of units of diene origin, always less than 15%). Within the "essentially unsaturated diene elastomer" category, the expression "highly unsaturated diene elastomer" is understood in particular to mean a diene elastomer having a content of units of diene origin (conjugated dienes) that is greater than 50%.

Having given these definitions, it will be understood more particularly that a diene elastomer that can be used in the compositions according to the invention means:
(a) any homopolymer obtained by polymerizing a conjugated diene monomer having 4 to 12 carbon atoms;
(b) any copolymer obtained by copolymerizing one or more conjugated dienes with one another or with one or more vinylaromatic compounds having 8 to 20 carbon atoms;
(c) a ternary copolymer obtained by copolymerizing ethylene, an α-olefin having 3 to 6 carbon atoms with an unconjugated diene monomer having 6 to 12 carbon atoms, such as for example the elastomers obtained from ethylene, propylene and an unconjugated diene monomer of the aforementioned type such as in particular 1,4-hexadiene, ethylidene norbornene and dicyclopentadiene; and
(d) a copolymer of isobutene and isoprene (butyl rubber), and also the halogenated, in particular chlorinated or brominated, versions of this type of copolymer.

Although the present invention applies to any type of diene elastomer, a person skilled in the art of tires will understand that it is preferably used with essentially unsaturated diene elastomers, in particular of the (a) or (b) type above.

Suitable conjugated dienes are, in particular, 1,3-butadiene, 2-methyl-1,3-butadiene, 2,3-di($C_1$-$C_5$)alkyl-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. Suitable vinylaromatic compounds are, for example, styrene, ortho-, meta- and para-methylstyrene, the commercial "vinyl-toluene" mixture, para-(tert-butyl)styrene, methoxystyrenes, chloro-styrenes, vinylmesitylene, divinylbenzene and vinylnaphthalene.

The copolymers can comprise between 99% and 20% by weight of diene units and between 1% and 80% by weight of vinylaromatic units. The elastomers can have any microstructure which depends on the polymerization conditions used, in particular on the presence or absence of a modifying and/or randomizing agent and on the amounts of modifying and/or randomizing agent employed. The elastomers can, for example, be block, random, sequential or microsequential elastomers and can be prepared in dispersion or in solution; they can be coupled and/or star-branched or else functionalized with a coupling and/or star-branching or functionalizing agent. For coupling with carbon black, mention may be made, for example, of functional groups comprising a C—Sn bond or of aminated functional groups, such as benzophenone, for example; for coupling with a reinforcing inorganic filler such as silica, mention may be made, for example, of silanol functional groups or polysiloxane functional groups having a silanol end (as described, for example, in FR 2 740 778 or U.S. Pat. No. 6,013,718), of alkoxysilane groups (as described, for example, in FR 2 765 882 or U.S. Pat. No. 5,977,238), of carboxyl groups (as described, for example, in WO 01/92402 or U.S. Pat. No. 6,815,473, WO 2004/096865 or US 2006/0089445) or else of polyether groups (as described, for example, in EP 1 127 909 or U.S. Pat. No. 6,503,973). Mention may also be made, as other examples of functionalized elastomers, of the elastomers (such as SBR, BR, NR or IR) of the epoxidized type.

Polybutadienes are suitable and in particular those having a content (mol %) of 1,2- units of between 4% and 80% or those having a content (mol %) of cis-1,4- units of greater than 80%, polyisoprenes, butadiene/styrene copolymers and in particular those having a $T_g$ (glass transition temperature, $T_g$, measured according to ASTM D3418) of between 0° C. and −70° C. and more particularly between −10° C. and −60° C., a styrene content of between 5% and 60% by weight and more particularly between 20% and 50%, a content (mol %) of 1,2- bonds of the butadiene part of between 4% and 75% and a content (mol %) of trans-1,4- bonds of between 10% and 80%, butadiene/isoprene copolymers and in particular those having an isoprene content of between 5% and 90% by weight and a $T_g$ of −40° C. to −80° C., or isoprene/styrene copolymers and in particular those having a styrene content of between 5% and 50% by weight and a $T_g$ of between −25° C. and −50° C. In the case of butadiene/styrene/isoprene copolymers, those having a styrene content of between 5% and 50% by weight and more particularly of between 10% and 40%, an isoprene content of between 15% and 60% by weight and more particularly between 20% and 50%, a butadiene content of between 5% and 50% by weight and more particularly of between 20% and 40%, a content (mol %) of 1,2- units of the butadiene part of between 4% and 85%, a content (mol %) of trans-1,4- units of the butadiene part of between 6% and 80%, a content (mol %) of 1,2- plus 3,4- units of the isoprene part of between 5% and 70% and a content (mol %) of trans-1,4- units of the isoprene part of between 10% and 50%, and more generally any butadiene/styrene/isoprene copolymer having a $T_g$ of between −20° C. and −70° C., are suitable in particular.

To sum up, the diene elastomer of the composition in accordance with the invention is particularly preferably chosen from the group of (highly unsaturated) diene elastomers consisting of polybutadienes (BR5), synthetic polyisoprenes (IRs), natural rubber (NR), butadiene copolymers, isoprene copolymers and mixtures of these elastomers. Such copolymers are more preferably chosen from the group consisting of butadiene/styrene copolymers (SBRs), isoprene/butadiene copolymers (BIR5), isoprene/styrene copolymers (SIRs), isoprene/butadiene/styrene copolymers (SBIRs) and mixtures of such copolymers.

According to one particular embodiment, the diene elastomer is predominantly (i.e., more than 50 phr) an SBR, whether it is an SBR prepared in emulsion ("ESBR") or an SBR prepared in solution ("SSBR"), or an SBR/BR, SBR/NR (or SBR/IR), BR/NR (or BR/IR) or else SBR/BR/NR (or SBR/BR/IR) blend (mixture). In the case of an SBR (ESBR or SSBR) elastomer, use is made in particular of an SBR having a moderate styrene content, for example of between 20% and 35% by weight, or a high styrene content, for example from 35 to 45%, a content of vinyl bonds of the butadiene part of between 15% and 70%, a content (mol %) of trans-1,4- bonds of between 15% and 75% and a $T_g$ of between −10° C. and −55° C.; such an SBR can advantageously be used as a mixture with a BR preferably having more than 90% (mol %) of cis-1,4- bonds.

According to another particular embodiment, the diene elastomer is predominantly (more than 50 phr) an isoprene elastomer. This is the case in particular when the compositions of the invention are intended to constitute, in tires, the rubber matrices of certain treads (for example, for industrial vehicles), of crown reinforcement plies (for example, working plies, protective plies or hoop plies), of carcass reinforcement plies, of sidewalls, of beads, of protectors, of sublayers, of blocks of rubber and other inner liners providing the interface between the aforementioned tyre zones.

The expression "isoprene elastomer" is understood, in a known manner, to mean an isoprene homopolymer or copolymer, in other words a diene elastomer chosen from the group consisting of natural rubber (NR), synthetic polyisoprenes (IRs), various isoprene copolymers and mixtures of these elastomers. Mention will in particular be made, among isoprene copolymers, of isobutene/isoprene (butyl rubber—IIR), isoprene/styrene (SIR), isoprene/butadiene (BIR) or isoprene/butadiene/styrene (SBIR) copolymers. This isoprene elastomer is preferably natural rubber or a synthetic cis-1,4-polyisoprene; use is preferably made, among these synthetic polyisoprenes, of polyisoprenes having a content (mol %) of cis-1,4- bonds of greater than 90%, more preferably still of greater than 98%.

According to another particular embodiment, especially when it is intended for a tyre sidewall, for an airtight inner liner of a tubeless tyre (or other air-impermeable element), the composition in accordance with the invention may contain at least one essentially saturated diene elastomer, in particular at least one EPDM copolymer or a butyl rubber (optionally chlorinated or brominated), whether these copolymers are used alone or as a mixture with highly unsaturated diene elastomers such as mentioned previously, especially NR or IR, BR or SBR.

According to another preferred embodiment of the invention, the rubber composition comprises a blend of a (one or more) "high $T_g$" diene elastomer having a $T_g$ of between −70° C. and 0° C. and of a (one or more) "low $T_g$" diene elastomer having a $T_g$ of between −110° C. and −80° C., more preferably between −105° C. and −90° C. The high $T_g$ elastomer is preferably chosen from the group consisting of S-SBRs, E-SBRs, natural rubber, synthetic polyisoprenes (having a content (mol %) of cis-1,4- linkages preferably greater than 95%), BIRs, SIRs, SBIRs and mixtures of these elastomers. The low $T_g$ elastomer preferably comprises butadiene units in a content (mol %) at least equal to 70%; it preferably consists of a polybutadiene (BR) having a content (mol %) of cis-1,4- linkages greater than 90%.

According to another particular embodiment of the invention, the rubber composition comprises, for example, from 30 to 100 phr, in particular from 50 to 100 phr, of a high $T_g$ elastomer as a blend with 0 to 70 phr, in particular from 0 to 50 phr, of a low $T_g$ elastomer; according to another example, it comprises, for the whole of the 100 phr, one or more SBR(s) prepared in solution.

According to another particular embodiment of the invention, the diene elastomer of the composition according to the invention comprises a blend of a BR (as low $T_g$ elastomer) having a content (mol %) of cis-1,4- linkages greater than 90%, with one or more S-SBRs or E-SBRs (as high $T_g$ elastomer(s)).

The compositions of the invention may contain a single diene elastomer or a mixture of several diene elastomers, it being possible for the diene elastomer(s) to be used in combination with any type of synthetic elastomer other than a diene elastomer, or even with polymers other than elastomers, for example thermoplastic polymers.

II-2. Reinforcing Inorganic Filler

The expression "reinforcing inorganic filler" should be understood here, in a known manner, to mean any inorganic or mineral filler, whatever its colour and its origin (natural or synthetic), also known as "white filler", "clear filler" or even "non-black filler", in contrast to carbon black, this inorganic filler being capable of reinforcing by itself alone, without means other than an intermediate coupling agent, a rubber composition intended for the manufacture of a tyre tread, in other words capable of replacing, in its reinforcing role, a conventional tyre-grade carbon black, in particular for a tread; such a filler is generally characterized, in a known manner, by the presence of hydroxyl (—OH) groups at its surface.

Preferably, the reinforcing inorganic filler is a siliceous filler or aluminous filler, or a mixture of these two types of fillers.

The silica ($SiO_2$) used may be any reinforcing silica known to a person skilled in the art, especially any precipitated or pyrogenic silica exhibiting a BET surface area and a CTAB specific surface area both of less than 450 $m^2/g$, preferably from 30 to 400 $m^2/g$. Highly dispersible precipitated silicas (referred to as "HDSs") are preferred, in particular when the invention is used for the manufacture of tires that have a low rolling resistance. Mention may be made, as examples of such silicas, of the Ultrasil 7000 silicas from Degussa, the Zeosil 1165MP, 1135MP and 1115MP silicas from Rhodia, the Hi-Sil EZ150G silica from PPG, the Zeopol 8715, 8745 or 8755 silicas from Huber.

The reinforcing alumina ($Al_2O_3$) used is preferably a highly dispersible alumina having a BET surface area ranging from 30 to 400 $m^2/g$, more preferably between 60 and 250 $m^2/g$, and a mean particle size at most equal to 500 nm, more preferably at most equal to 200 nm. Mention may especially be made, as non-limiting examples of such reinforcing aluminas, of the "Baikalox A125" or "CR125" (Baïkowski), "APA-100RDX" (Condéa), "Aluminoxid C" (Degussa) or "AKP-G015" (Sumitomo Chemicals) aluminas.

Mention may also be made, as other examples of inorganic filler capable of being used in the rubber compositions of treads of the invention, of aluminium (oxide)hydroxides, aluminosilicates, titanium oxides, silicon carbides or nitrides, all of the reinforcing type as described for example in applications WO 99/28376, WO 00/73372, WO 02/053634, WO 2004/003067 and WO 2004/056915.

When the treads of the invention are intended for tires with low rolling resistance, the reinforcing inorganic filler used, in particular when it is silica, preferably has a BET surface area between 60 and 350 $m^2/g$. One advantageous embodiment of the invention consists in using a reinforcing inorganic filler, in particular a silica, having a high BET specific surface area, within a range from 130 to 300 $m^2/g$, due to the recognized high reinforcing power of such fillers. According to another preferred embodiment of the invention, use may be made of a reinforcing inorganic filler, in particular a silica, exhibiting a BET specific surface area of less than 130 $m^2/g$, preferably in such a case of between 60 and 130 $m^2/g$ (see, for example, applications WO 03/002648 and WO 03/002649).

The physical state in which the reinforcing inorganic filler is provided is not important, whether it is in the form of a powder, of microbeads, of granules, of balls or any other appropriate densified form. Of course, the expression "reinforcing inorganic filler" is also understood to mean mixtures of various reinforcing inorganic fillers, in particular of highly dispersible siliceous and/or aluminous fillers as described above.

A person skilled in the art will know how to adjust the content of reinforcing inorganic filler according to the nature of the inorganic filler used and according to the type of tyre concerned, for example a tyre for a motorcycle, for a passenger vehicle or for a utility vehicle, such as a van or a heavy vehicle. Preferably, this content of reinforcing inorganic filler will be chosen between 20 and 200 phr, more preferably between 30 and 150 phr, in particular greater than 50 phr and more preferably still between 60 and 140 phr.

In the present account, the BET specific surface area is determined in a known manner by gas adsorption using the Brunauer-Emmett-Teller method described in "*The Journal of the American Chemical Society*", Vol. 60, page 309, February 1938, more specifically according to French Standard NF ISO 9277 of December 1996 (multipoint volumetric method (5 points)—gas: nitrogen—degassing: 1 hour at 160° C.—range of relative pressure p/po: 0.05 to 0.17). The CTAB specific surface area is the external surface area determined according to French Standard NF T 45-007 of November 1987 (method B).

Finally, a person skilled in the art will understand that a reinforcing filler of another nature, in particular an organic filler, might be used as filler equivalent to the reinforcing inorganic filler described in the present section, provided that this reinforcing filler is covered with an inorganic layer, such as silica, or else comprises, at its surface, functional sites, in particular hydroxyl sites, requiring the use of a coupling agent in order to establish the bonding between the filler and the elastomer. Mention may be made, as examples of such organic fillers, of functionalized polyvinylaromatic organic fillers, such as described in applications WO 2006/069792 and WO 2006/069793.

The reinforcing inorganic filler may also be used combined with an organic reinforcing filler, in particular carbon black, for example a black of the HAF, ISAF or SAF type, conventionally used in tires and particularly in tyre treads, (for example N115, N134, N234, N326, N330, N339, N347 or N375 blacks, or else, depending on the applications targeted, the blacks of higher series, for example N660, N683 or N772). These carbon blacks may be used in the isolated state, as available commercially, or in any other form, for example as a support for some of the rubber additives used. The carbon blacks might, for example, be already incorporated into the elastomer in the form of a masterbatch (see, for example, applications WO 97/36724 or WO 99/16600).

The amount of carbon black present in the total reinforcing filler may vary to a large extent; it is preferably less than that of the reinforcing metal hydroxide. Advantageously, carbon black is used in a very small proportion, at a preferred content of less than 10 phr. In the ranges indicated, the colouring properties (black pigmenting agent) and UV-stabilizing properties of the carbon blacks are benefited from, without, moreover, adversely affecting the typical performances provided by the reinforcing inorganic filler. Of course, the composition of the invention may itself be completely free of carbon black.

II-3. Coupling Agent

The organosilane used as coupling agent according to the invention has the general formulation I below:

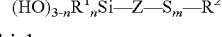

$(HO)_{3-n}R^1{}_nSi-Z-S_m-R^2$ in which:
R$^1$, which are identical or different, each represent a monovalent hydrocarbon-based group chosen from alkyls, which are linear or branched, cycloalkyls or aryls, having from 1 to 18 carbon atoms;

R$^2$ represents a monovalent hydrocarbon-based group chosen from alkyls, which are linear or branched, cycloalkyls or aryls, having from 1 to 30 carbon atoms;

Z represents a divalent bonding group comprising from 1 to 18 carbon atoms;

n is an integer equal to 0, 1 or 2; and m is a number greater than or equal to 2, m is an integer or a fraction.

Z may contain one or more heteroatoms chosen from O, S and N.

Preferably n is equal to 1 and/or m is equal to 2.

Advantageously:

R$^1$ is chosen from methyl, ethyl, n-propyl and isopropyl, preferably from methyl and ethyl;

Z is chosen from $C_1$-$C_{18}$ alkylenes and $C_6$-$C_{12}$ arylenes.

According to one embodiment, Z is chosen from $C_1$-$C_{10}$ alkylenes and more preferably Z is chosen from $C_1$-$C_4$ alkylenes.

According to another embodiment, $R^1$ is a methyl.

Preferably $R^2$ is chosen from alkyls having from 1 to 18 carbon atoms, and more preferably still $R^2$ is an octyl.

One coupling agent that is particularly suitable is (3-(octyldisulphanyl)propyl)methyl-silanediol, the formula (I)° of which is such that n is equal to 1, m is equal to 2, $R^1$ is a methyl, Z is a propylene and $R^2$ is an octyl.

The organosilanes of formula (I) according to the invention, in which n is equal to 1 and m is equal to 2, may be prepared according to a synthesis process comprising the following steps:

added to a diazodicarboxylate is a mercaptan of formula (II):

in which $R^2$ has the same meaning as in formula (I), in order to form a thiohydrazine, the thiohydrazine obtained is substituted with a second mercaptan of formula (III):

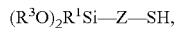

in which:
R$^1$ and Z have the same meaning as in formula (I),
R$^3$, which are identical or different, represent a monovalent hydrocarbon-based group chosen from alkyls having from 1 to 6 carbon atoms, preferably having from 1 to 3 carbon atoms, a hydrolysis is carried out in an acid medium that makes it possible to result in the targeted organosilane of formula (I).

It should be noted that a person skilled in the art knows how to add sulphur to the organosilane disulphide thus obtained to enable it to pass from $S_2$ to $S_x$ where x is greater than 2.

A person skilled in the art will know how to adjust the content of organosilane of formula (I) as a function of the particular embodiments of the invention, especially of the amount of reinforcing inorganic filler used, the preferred content representing between 2% and 20% by weight relative to the amount of reinforcing inorganic filler; contents of less than 15% are more particularly preferred.

II-5. Various Additives

The rubber compositions in accordance with the invention may also comprise all or some of the usual additives customarily used in the elastomer compositions intended for the manufacture of tires, in particular of treads, such as, for example, plasticizers or extender oils, whether the latter are of aromatic or non-aromatic nature, pigments, protective agents, such as anti-ozone waxes, chemical antiozonants, antioxidants, anti-fatigue agents, reinforcing resins, methylene acceptors (for example, phenol-novolac resin) or methylene donors (for example, HMT or H3M) as described, for example, in application WO 02/10269, a crosslinking system based either on sulphur or on sulphur donors and/or on peroxide and/or on bismaleimides, vulcanization accelerators and vulcanization activators.

Preferably, these compositions comprise, as preferred non-aromatic or very weakly aromatic plasticizing agent, at least one compound chosen from the group consisting of naphthenic oils, paraffinic oils, MES oils, TDAE oils, glycerol esters (in particular trioleates), hydrocarbon-based plasticizing resins exhibiting a high $T_g$ preferably of greater than 30° C., and mixtures of such compounds.

These compositions may, in addition to coupling agents, also contain coupling activators, covering agents (comprising for example the sole Y function) for covering the reinforcing inorganic filler or more generally processing aids capable, in a known manner, by virtue of an improvement of the dispersion of the inorganic filler in the rubber matrix and of a lowering of the viscosity of the compositions, of improving their ability to be processed in the uncured state, these agents being, for example, hydrolysable silanes, such as alkylalkoxysilanes (especially alkyltriethoxysilanes), polyols, polyethers (for example polyethylene glycols), primary, secondary or tertiary amines (for example trialkanolamines), hydroxylated or hydrolysable POSs, for example α,ω-dihydroxy-polyorganosiloxanes (especially α,ω-dihydroxy-polydimethylsiloxanes), fatty acids such as, for example, stearic acid.

It is also possible to add to the reinforcing filler described above, i.e. the reinforcing inorganic filler plus carbon black where appropriate, depending on the targeted application, inert (i.e. non-reinforcing) fillers such as particles of clay, bentonite, talc, chalk, kaolin, which can be used, for example, in coloured tyre sidewalls or treads.

II-6. Manufacture of the Rubber Compositions

The rubber compositions of the invention are manufactured in appropriate mixers using two successive preparation phases according to a general procedure well known to a person skilled in the art: a first phase of thermomechanical working or kneading (sometimes described as "non-productive" phase) at high temperature, up to a maximum temperature of between 130° C. and 200° C., preferably between 145° C. and 185° C., followed by a second phase of mechanical working (sometimes described as "productive" phase) at a lower temperature, typically of less than 120° C., for example between 60° C. and 100° C., finishing phase during which the crosslinking or vulcanization system is incorporated. According to one preferred embodiment of the invention, all the base constituents of the compositions of the invention, with the exception of the vulcanization system, namely the reinforcing inorganic filler, the coupling agent of formula (I) and the carbon black, are intimately incorporated, by kneading, into the diene elastomer during the so-called non-productive first phase, that is to say at least these various base constituents are introduced into the mixer and thermomechanically kneaded, in one or more stages, until the maximum temperature between 130° C. and 200° C., preferably between 145° C. and 185° C., is reached.

By way of example, the first (non-productive) phase is carried out in a single thermomechanical stage during which all the necessary constituents, the optional complementary covering agents or processing aids and other various additives, with the exception of the vulcanization system, are introduced into a suitable mixer, such as a standard internal mixer. The total kneading time in this non-productive phase is preferably between 1 and 15 min. After cooling the mixture obtained in this way during the non-productive first phase, the vulcanization system is then incorporated at low temperature, generally in an external mixer such as an open mill. All the ingredients are then mixed (productive phase) for a few minutes, for example between 2 and 15 min.

The vulcanization system itself is preferably based on sulphur and on a primary vulcanization accelerator, in particular an accelerator of the sulphenamide type. Various known vulcanization activators or secondary accelerators, such as for example fatty acids such as stearic acid, guanidine derivatives (in particular diphenylguanidine), etc. may be added to this vulcanization system, incorporated during the first non-productive phase and/or during the productive phase. It should be noted that it is necessary to take into account the nature of the vulcanization activators or secondary accelerators (zinc or zinc derivative such as ZnO), in order to comply with the desired zinc content, in particular for producing a composition that is completely free of zinc or almost free of zinc (i.e. with a zinc content of less than 0.5 phr, and preferably of less than 0.3 phr).

The sulphur content is preferably between 0.5 and 3.0 phr, and the content of primary accelerator is preferably between 0.5 and 5.0 phr.

The final composition thus obtained is then calendered, for example in the form of a film or a sheet, especially for laboratory characterization, or else extruded in the form of a rubber profiled element that can be used for example as a tyre tread for a passenger vehicle.

The vulcanization (or curing) is carried out in a known manner at a temperature generally between 130° C. and 200° C., for a sufficient time, which may for example vary between 5 and 90 minutes, depending in particular on the curing temperature, on the vulcanization system adopted and on the vulcanization kinetics of the composition in question.

The invention relates to the rubber compositions described above both in the "uncured" state (i.e., before curing) and in the "cured" or vulcanized state (i.e., after crosslinking or vulcanization). The compositions in accordance with the invention may be used alone or as a blend (i.e., as a mixture) with any other rubber composition that can be used for the manufacture of tires.

III. Exemplary Embodiments Of The Invention

III-1 Synthesis of (3-(octyldisulphanyl)propyl)methylsilanediol (3-(Octyldisulphanyl)propyl)methylsilanediol is a coupling agent in accordance with the invention of formula (I) in which:

n is equal to 1, m is equal to 2, $R^1$ is a methyl, $R^2$ is an octyl and Z is a propylene.

The synthesis is carried out according to the following reaction scheme:

a) Synthesis of Compound A

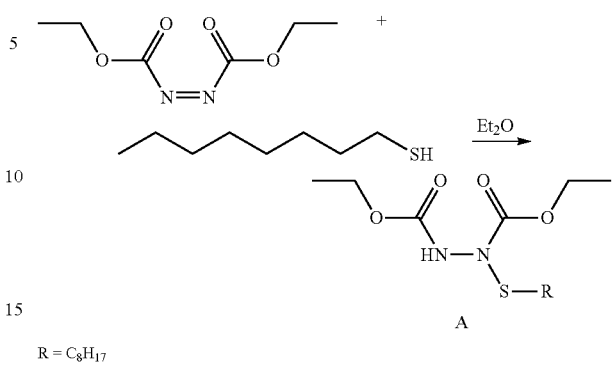

R = $C_8H_{17}$

The solution of octanethiol (45.0 g, 0.308 mol) in diethyl ether (250 mL) is added dropwise over 15 minutes to a solution of diethylazodicarboxylate (DEAD with CAS number [1972-28-7] (51.0 g, 0.293 mol) in diethyl ether (100 mL) kept at −22° C. The temperature of the reaction medium remains between −20 and −25° C. The reaction medium is then stirred for 10-15 minutes at a temperature between −20 and −25° C. and for 1.0-1.5 hours at room temperature. After evaporating the solvents under reduced pressure (Tbath 21° C., 11 mbar), petroleum ether (400 mL, 40-60° C. fraction) is added and the mixture is cooled to −18° C. The precipitate of diethyl hydrazodicarboxylate (10.4 g) is filtered and is washed twice with cold petroleum ether (2×20 mL at −18° C.). After evaporating the solvents under reduced pressure (Tbath 23° C., 70 mbar) the product A is obtained in the form of a red oil. An additional purification by chromatography on a silica column (elution gradient: petroleum ether/ethyl acetate, 10/1 to 2/1) makes it possible to collect the product A in the form of a colourless oil (58.3 g, 0.173 mol) with a yield of 59%. The molar purity estimated by $^1$H NMR is greater than 90%.

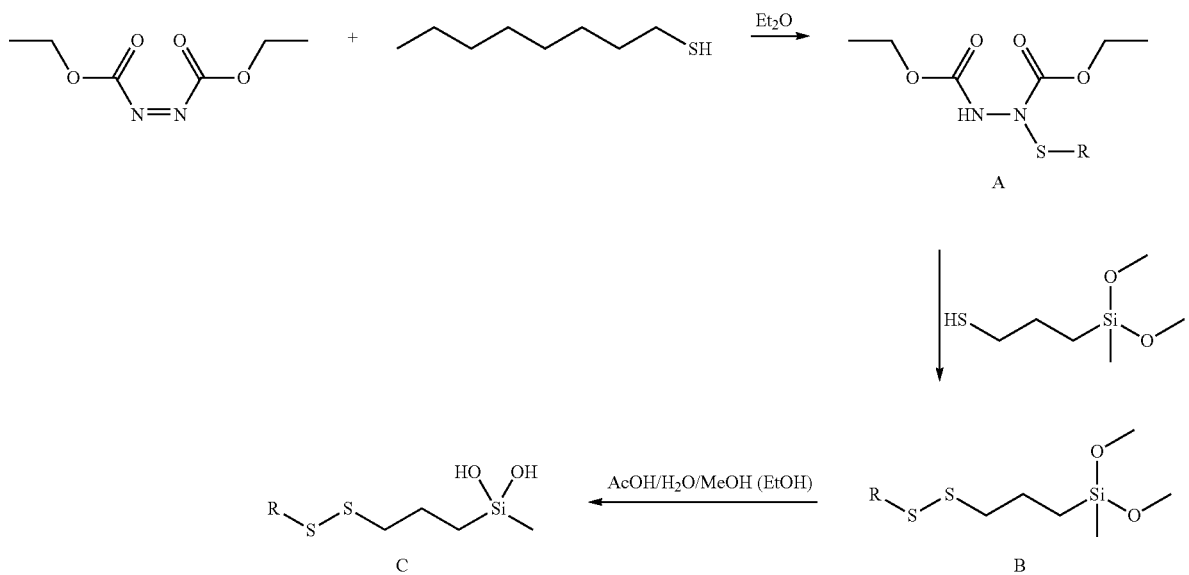

R = $C_8H_{17}$ b) Synthesis of Compound B

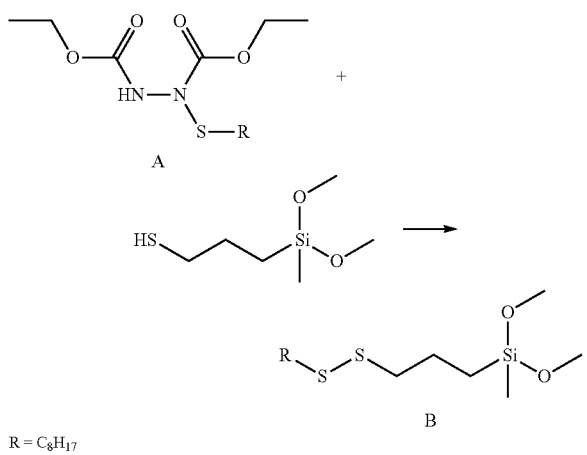

3-Mercaptopropyldimethoxymethysilane (42.4 g, 0.235 mol) is added to compound B (57.9 g, 0.181 mol). The reaction is exothermic. The reaction medium is then stirred for 2.0-3.5 hours at 120° C. After cooling, petroleum ether (550 mL, 40-60° C. fraction) is added. The mixture is cooled to −18° C. over 12 hours. The precipitate of diethyl hydrazodicarboxylate (28.9 g, 91% yield) is filtered and is washed twice with petroleum ether (2×20 mL, 40-60° C. fraction, −18° C.). After evaporating the solvents under reduced pressure (Tbath 45° C., 12 mbar) the oil obtained is distilled under vacuum (the fraction collected has a boiling point between 98° C. ($3.0\times10^{-2}$ mbar) and 102° C. ($4.3\times10^{-2}$ mbar)). The product B (53.8 g, 0.167 mol) is obtained in the form of a colourless oil with a yield of 92%. The molar purity estimated by $^1$H and $^{29}$Si NMR is greater than 96% (the remaining 4% being composed of the product A that has not reacted).

c) Synthesis of Compound C

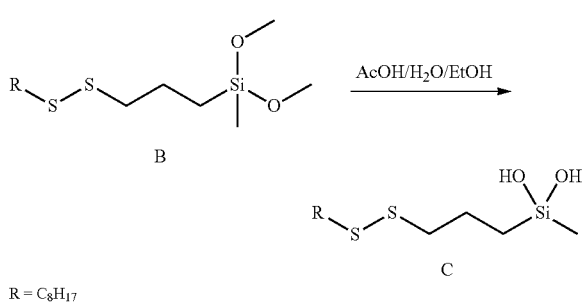

Compound B (53.0 g, 0.163 mol) is added to a mixture of 0.5% acetic acid, water (105 mL) and ethanol (530 mL). The solution is stirred for 2-3 hours at room temperature then the mixture is poured into water (3600 mL). The product is extracted with diethyl ether (3×300 mL). After evaporating the solvents under reduced pressure (Tbath 21° C.), the oil obtained (60 g) is recrystallized in petroleum ether (850 mL, 40-60° C. fraction) at −20° C. over 12 to 15 hours. The crystals (30.1 g) are filtered, washed with petroleum ether (2×80 mL, −18° C.) and then dried for 2 to 3 hours under reduced pressure. After evaporating the filtrate down to 200-250 mL under reduced pressure (Tbath 21° C.) and crystallization at −20° C. for 2 to 3 hours, the additional crystals (5.4 g) are filtered, washed with petroleum ether (2×25 mL, −18° C.) and then dried for 2 to 3 hours under reduced pressure.

The two fractions are combined then recrystallized in a mixture of petroleum ether (580 mL, 40-60° C. fraction), Et$_2$O (230 mL) for 12 hours. After filtering, washing with petroleum ether (2×60 mL, −18° C.) then evaporating the residual solvents under reduced pressure for 2-3 hours, the product C (30.1 g, 0.101 mol) is obtained with a yield of 62% in the form of a white solid having a melting point of 57° C. The molar purity estimated by $^1$H and $^{29}$Si NMR is greater than 98%.

The yield may be brought to 70% by a supplementary crystallization of the mother liquors.

III-2 Preparation of the Rubber Compositions

The tests which follow are carried out in the following way: the diene elastomer (SBR and BR blend), the silica, supplemented with a small amount of carbon black, the coupling agent and then, after kneading for one to two minutes, the various other ingredients, with the exception of the vulcanization system, are introduced into an internal mixer, 70% filled and having an initial vessel temperature of approximately 90° C. Thermomechanical working (non-productive phase) is then carried out in one stage (total duration of the kneading equal to approximately 5 min) until a maximum "dropping" temperature of approximately 165° C. is reached. The mixture thus obtained is recovered and cooled and then the covering agent (when the latter is present) and the vulcanization system (sulphur and sulphenamide accelerator) are added on an external mixer (homofinisher), at 50° C., the combined mixture being mixed (productive phase) for approximately 5 to 6 min.

The compositions thus obtained are subsequently calendered, either in the form of sheets (thickness of 2 to 3 mm) or of thin films of rubber, for the measurement of their physical or mechanical properties, or in the form of profiled elements which can be used directly, after cutting and/or assembling to the desired dimensions, for example as semi-finished products for tires, in particular as tyre treads.

III-3 Characterization of the Rubber Compositions

III-3.1 Test 1

The purpose of this test is to demonstrate the improved properties of a "standard" rubber composition according to the invention; the word standard is understood here to mean the fact that the compositions comprise a vulcanization system customarily used in rubber compositions for tires, compared with rubber compositions that are "standard" rubber compositions but that use coupling agents conventionally used in rubber compositions for tyre treads having silica as the reinforcing filler.

For this, three compositions based on a diene elastomer (SBR/BR blend), reinforced with a highly dispersible silica (HDS) are prepared, these compositions differing essentially in the following technical characteristics:

composition C1 is a control "standard" composition containing the compound TESPT (trade name: "Si69") as coupling agent, composition C2 is a "standard" composition containing the compound TESPD (trade name: "Si266") as coupling agent, "standard" composition C3 in accordance with the invention, comprises (3-(octyldisulphanyl)propyl)methylsilanediol as coupling agent.

In order for the properties of compositions C1 to C3 to be comparable, the coupling agents of compositions C2 to C3 are used at a content that is isomolar in silicon compared to the control composition C1.

The conventional coupling agent used in the control composition C1 is TESPT. It is recalled that TESPT is bis(3-triethoxysilylpropyl)tetrasulphide having the structural formula (Et=ethyl):

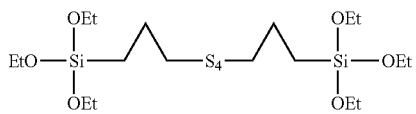

The coupling agent used in composition C2 is TESPD, which is bis(3-triethoxysilylpropyl)disulphide and therefore closer to the coupling agent in accordance with the invention: (3-(octyldisulphanyl)propyl)methylsilanediol since it is also a disulphide. TESPD has the following formulation:

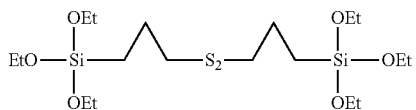

Tables 1 and 2 give the formulation of the various compositions (Table 1—content of the various products expressed in phr or parts by weight per hundred parts of elastomer) and also their properties before and after curing (around 40 min at 150° C.); the vulcanization system consists of sulphur and sulphonamide.

Examination of the results from Table 2 regarding the properties before curing firstly shows, compared to the control composition C1, that only composition C3 in accordance with the invention, comprising a coupling agent of general formula (I), makes it possible both to improve the scorch safety (scorch time T5 longer than that of C1) and to noticeably improve the processability of the composition (much lower Mooney value than for composition C1, 30% lower than that of C1).

It may be noted that composition C2, not in accordance with the invention, also has a better scorch safety relative to composition C1. However, it is difficult to capitalize on this scorch safety property given the high value of the Mooney plasticity of composition C2 (which makes it difficult to process in the uncured state).

Furthermore, observation of the properties of these compositions after curing shows that, quite remarkably, composition C3 in accordance with the invention has a hysteresis that on the whole is equivalent to that of the control composition C1, unlike composition C2 for which a large increase in hysteresis is observed (high values of $\tan(\delta)_{max}$ and $\Delta G^*$). The hysteresis is a recognized indicator of the rolling resistance of tires; the lower the hysteresis is, the lower the rolling resistance and consequently the lower the energy consumption of motor vehicles fitted with such tires.

It clearly appears that a composition in accordance with the invention comprising, as coupling agent, an organosilane of formula (I) makes it possible to obtain properties that are equivalent, or even improved (processability, scorch safety) relative to the control standard composition.

It may furthermore be noted that the use of an organosilane in accordance with the invention is particularly advantageous from the point of view of the environment. Specifically, it makes it possible to dispose of the problem of the release of VOCs (volatile organic compounds). Indeed, the organosilane in accordance with the invention does not possess any alkoxyl groups (such as the ethoxyl groups of TESPT or of TESPD) that are the source of the release of alcohol (ethanol in the case of TESPT and TESPD), both during the manufacture of the rubber compositions themselves and during the curing of rubber articles incorporating these compositions.

III-3.1 Test 2

The purpose of this test is to demonstrate the improved properties of zinc-free rubber compositions according to the invention in comparison with rubber compositions that are free of zinc but that use coupling agents conventionally used in rubber compositions for tyre treads having silica as the reinforcing filler.

For this, four compositions based on a diene elastomer (SBR/BR blend), reinforced with a highly dispersible silica (HDS) are prepared, these compositions differing essentially in the following technical characteristics:

composition C1 is a control "standard" composition containing zinc (1.5 phr of ZnO) and the compound TESPT (trade name: "Si69") as coupling agent, identical to that from Test 1, composition C'1 corresponds to composition C1 but is free of zinc, composition C'2 is a composition that is free of zinc and comprises the compound TESPD (trade name: "Si266") as coupling agent, composition C'3 in accordance with the invention is free of zinc and comprises (3-(octyldisulphanyl)propyl)methylsilanediol as coupling agent.

Only composition C'3 is in accordance with the invention.

In order for the properties of compositions C1 and C'1 to C'3 to be comparable, the coupling agents of compositions C'1 to C'3 are used at a content that is isomolar in silicon compared to the control composition C1.

Tables 3 and 4 give the formulation of the various compositions (Table 3—content of the various products expressed in phr or parts by weight per hundred parts of elastomer) and also their properties before curing.

As expected, it is observed on reading Table 4 that eliminating zinc from composition C'1 results in a decrease in the processability (increase in the Mooney value) and a reduction in the scorch time T5, and therefore in the scorch safety, compared to the control composition C1.

Composition C'2 has an acceptable scorch time T5, but an unacceptable decrease in the processability (considerable increase in the Mooney value).

On the other hand, quite astonishingly, it is observed that composition C'3 in accordance with the invention has not only a scorch time that is identical to the control composition C1 which comprises zinc in a customary amount, but also a processability that is greatly improved compared to this same composition.

It clearly appears that a composition in accordance with the invention comprising, as coupling agent, an organosilane of formula (I) makes it possible to obtain properties in the uncured state that are equivalent, or even improved relative to the control standard composition, without using zinc, unlike compositions comprising other coupling agents, including organosilane disulphides that have a different formula to that of the invention.

It will be noted that the use of an organosilane in accordance with the invention is particularly advantageous from the point of view of the environment with respect to the problem of the release of VOCs mentioned in Test 1 and with respect to the possibility of eliminating zinc from the vulcanization system of a rubber composition without degrading the properties of this composition.

TABLE 1

| | Composition No. | | |
|---|---|---|---|
| | C1 | C2 | C3 |
| SBR (1) | 70 | 70 | 70 |
| BR (2) | 30 | 30 | 30 |
| Silica (3) | 80 | 80 | 80 |
| coupling agent (4) | 6.4 | — | — |
| coupling agent (5) | — | 5.8 | — |
| coupling agent (6) | — | — | 7.2 |
| carbon black (7) | 5 | 5 | 5 |
| MES oil (8) | 6 | 6 | 6 |
| plasticizing resin (9) | 20 | 20 | 20 |
| DPG (10) | 1.5 | 1.5 | 1.5 |
| anti-ozone wax (11) | 1.5 | 1.5 | 1.5 |
| ZnO (12) | 1.5 | 1.5 | 1.5 |
| antioxidant (13) | 2 | 2 | 2 |
| stearic acid (14) | 2 | 2 | 2 |
| sulphur | 1 | 1 | 1 |
| accelerator (15) | 2 | 2 | 2 |

(1) SSBR with 25% of styrene, 59% of 1,2-polybutadiene units and 20% of trans-1,4-polybutadiene units ($T_g = -24°$ C.); content expressed as dry SBR (SBR extended with 9% of MES oil, i.e. a total of SSBR + oil equal to 76 phr);
(2) BR (Nd) with 0.7% of 1,2-; 1.7% of trans-1,4-; 98% of cis-1,4- ($T_g = -105°$ C.);
(3) "ZEOSIL 1165 MP" silica from Rhodia in the form of micropearls (BET and CTAB: around 150-160 $m^2/g$);
(4) TESPT ("Si69" from Evonik-Degussa);
(5) TESPD ("Si266" from Evonik-Degussa);
(6) (3-(octyldisulphanyl)propyl)methylsilanediol (synthesized product);
(7) N234 (Evonik-Degussa);
(8) MES oil ("Catenex SNR" from Shell);
(9) polylimonene resin ("Dercolyte L120" from DRT);
(10) diphenylguanidine (Perkacit DPG from Flexsys);
(11) mixture of macrocrystalline and microcrystalline anti-ozone waxes;
(12) zinc oxide (industrial grade - Umicore);
(13) N-1,3-dimethylbutyl-N-phenyl-para-phenylenediamine ("Santoflex 6-PPD" from Flexsys);
(14) stearine ("Pristerene 4931" - Uniqema);
(15) N-cyclohexyl-2-benzothiazylsulphenamide ("Santocure CBS" from Flexsys).

TABLE 2

| | Composition No. | | |
|---|---|---|---|
| | C1 | C2 | C3 |
| Properties before curing | | | |
| Mooney (MU) | 93 | 121 | 65 |
| T5 (min) | 21 | >30 | >30 |
| Properties after curing | | | |
| ΔG* (MPa) | 4.75 | 5.75 | 4.48 |
| $\tan(\delta)_{max}$ | 0.361 | 0.389 | 0.374 |

TABLE 3

| | Composition No. | | | |
|---|---|---|---|---|
| | C1 | C'1 | C'2 | C'3 |
| SBR (1) | 70 | 70 | 70 | 70 |
| BR (2) | 30 | 30 | 30 | 30 |
| Silica (3) | 80 | 80 | 80 | 80 |
| coupling agent (4) | 6.4 | 6.4 | — | — |
| coupling agent (5) | — | — | 5.8 | — |
| coupling agent (6) | — | — | — | 7.2 |
| carbon black (7) | 5 | 5 | 5 | 5 |
| MES oil (8) | 6 | 6 | 6 | 6 |
| plasticizing resin (9) | 20 | 20 | 20 | 20 |
| DPG (10) | 1.5 | 1.5 | 1.5 | 1.5 |
| anti-ozone wax (11) | 1.5 | 1.5 | 1.5 | 1.5 |
| ZnO (12) | 1.5 | — | — | — |
| antioxidant (13) | 2 | 2 | 2 | 2 |
| stearic acid (14) | 2 | 2 | 2 | 2 |
| sulphur | 1 | 1 | 1 | 1 |
| accelerator (15) | 2 | 2 | 2 | 2 |

TABLE 4

| | Composition No. | | | |
|---|---|---|---|---|
| | C1 | C'1 | C'2 | C'3 |
| Properties before curing | | | | |
| Mooney (MU) | 93 | 97 | 129 | 64 |
| T5 (min) | 21 | 11 | 18 | 22 |

The invention claimed is:

1. A rubber composition that can be used for the manufacture of tires, based on at least:
   one diene elastomer;
   one sulphur-based crosslinking system;
   one inorganic filler as reinforcing filler;
   one coupling agent of general formula I below:

$$(HO)_{3-n} R^1_n Si—Z—S_m—R^2$$

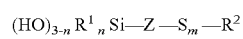

wherein:
   $R^1$, which are identical or different, each represent a monovalent hydrocarbon group chosen from alkyls, which are linear or branched, cycloalkyls or aryls, having from 1 to 18 carbon atoms;
   $R^2$ represents a monovalent hydrocarbon group chosen from alkyls, which are linear or branched, cycloalkyls or aryls, having from 1 to 30 carbon atoms;
   Z represents a divalent bonding group comprising from 1 to 18 carbon atoms;
   n is an integer equal to 0, 1 or 2; and
   m is a number greater than or equal to 2.

2. The composition according to claim 1, wherein n is equal to 1.

3. The composition according to claim 1, wherein Z contains one or more heteroatoms chosen from O S and N.

4. The composition according to claim 1, wherein m is equal to 2.

5. The composition according claim 1, wherein:
   $R^1$ is chosen from methyl, ethyl, n-propyl and isopropyl;
   Z is chosen from $C_1$-$C_{18}$ alkylenes and $C_6$-$C_{12}$ arylenes.

6. The composition according to claim 5, wherein Z is chosen from $C_1$-$C_{10}$ alkylenes.

7. The composition according to claim 6, wherein Z is chosen from $C_1$-$C_4$ alkylenes.

8. The composition according to claim 5, wherein $R^1$ is a methyl.

9. The composition according to claim 5, wherein $R^2$ is chosen from alkyls having from 1 to 18 carbon atoms.

10. The composition according to claim 8, wherein $R^2$ is an octyl.

11. The composition according to claim 5, wherein m is equal to 2, $R^1$ is a methyl, $R^2$ is an octyl and Z is a propylene.

12. The composition according to claim 1, wherein the diene elastomer being chosen from the group consisting of polybutadienes, synthetic polyisoprenes, natural rubber, butadiene copolymers, isoprene copolymers and mixtures of these elastomers.

13. The composition according to claim 1, wherein the reinforcing inorganic filler is the predominant reinforcing filler.

14. The composition according to claim 1, wherein the reinforcing inorganic filler is a siliceous or aluminous filler.

15. The composition according to claim 1, wherein the amount of reinforcing inorganic filler is greater than 50 phr, parts by weight per hundred parts of elastomer.

16. The composition according to claim 1, wherein the content of coupling agent represents between 2% and 20% by weight relative to the amount of reinforcing inorganic filler.

17. The composition according to claim 1, wherein the zinc content is less than 0.5 phr.

18. A process for preparing a composition, wherein, incorporated at least, by kneading, into at least (i) one diene elastomer, are (ii) an inorganic filler as reinforcing filler, (iii) a coupling agent of general formula I below:

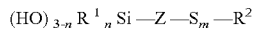

wherein:
R$^1$, which are identical or different, each represent a monovalent hydrocarbon group chosen from alkyls, which are linear or branched, cycloalkyls or aryls, having from 1 to 18 carbon atoms;
R$^2$ represents a monovalent hydrocarbon group chosen from alkyls, which are linear or branched, cycloalkyls or aryls, having from 1 to 30 carbon atoms;
Z represents a divalent bonding group comprising from 1 to 18 carbon atoms;
n is an integer equal to 0, 1 or 2; and
m is a number greater than or equal to 2,
and (iv) a sulphur-based vulcanization system.

19. The process according to claim 18, comprising the steps of:
incorporating into the diene elastomer, in a mixer, the reinforcing filler and the coupling agent by thermomechanically kneading all the ingredients, one or more times, until a maximum temperature between 130° C. and 200° C. is reached;
cooling the mixture down to a temperature below 100° C.;
then incorporating: the vulcanization system;
kneading all the ingredients up to a maximum temperature below 120° C.; and
extruding or calendering the rubber composition thus obtained.

20. A tire or semi-finished product comprising a rubber composition according to claim 1.

21. A tire tread comprising a rubber composition according to claim 1.

22. The composition according claim 1, wherein:
R1 is chosen from methyl and ethyl.

* * * * *